United States Patent
Na et al.

(10) Patent No.: US 9,851,089 B2
(45) Date of Patent: Dec. 26, 2017

(54) DISPLAY APPARATUS

(71) Applicant: SAMSUNG ELECTRONICS CO., LTD., Suwon-si (KR)

(72) Inventors: Jeong Shan Na, Hwaseong-si (KR); Jong Bin Kim, Suwon-si (KR); Jae Hak Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 15/067,703

(22) Filed: Mar. 11, 2016

(65) Prior Publication Data

US 2016/0265759 A1 Sep. 15, 2016

(30) Foreign Application Priority Data

Mar. 13, 2015 (KR) .................. 10-2015-0035190

(51) Int. Cl.
  *F21V 29/83* (2015.01)
  *G02F 1/1335* (2006.01)
  *F21V 29/60* (2015.01)

(52) U.S. Cl.
  CPC ............ *F21V 29/83* (2015.01); *F21V 29/60* (2015.01); *G02F 1/133602* (2013.01); *G02F 1/133603* (2013.01); *G02F 2001/133628* (2013.01)

(58) Field of Classification Search
  None
  See application file for complete search history.

(56) References Cited

U.S. PATENT DOCUMENTS

| 2008/0108439 | A1  | 5/2008  | Cole |
| 2012/0320566 | A1* | 12/2012 | Namekata ......... G02F 1/133603 362/97.3 |
| 2014/0085866 | A1* | 3/2014  | Shirai ............... G02F 1/133608 362/97.1 |

FOREIGN PATENT DOCUMENTS

| KR | 10-2009-0032301 A | 4/2009 |
| KR | 10-2009-0060654 A | 6/2009 |
| WO | 2012/026175 A1 | 3/2012 |
| WO | 2013/182733 A1 | 12/2013 |

OTHER PUBLICATIONS

Communication dated Jun. 24, 2016 issued by the European Patent Office in counterpart European Patent Application No. 16159042.7.
Communication dated Mar. 21, 2017 issued by the European Patent Office in counterpart European Patent Application No. 16 159 042.7.

* cited by examiner

*Primary Examiner* — Kristy A Haupt
(74) *Attorney, Agent, or Firm* — Sughrue Mion, PLLC

(57) ABSTRACT

Disclosed herein is a display apparatus having a cooling path provided to enhance cooling efficiency. The display apparatus includes a display panel configured to display images; a light source configured to radiate light toward the display panel; a bottom chassis disposed in rear of the light source; a case provided in rear of the bottom chassis; a circulative cooling path provided as to have air circulated surroundings of the bottom chassis.

18 Claims, 12 Drawing Sheets

DISPLAY APPARATUS

CROSS-REFERENCE TO RELATED APPLICATION

This application claims priority from the Korean Patent Application No. 10-2015-0035190, filed on Mar. 13, 2015, in the Korean Intellectual Property Office, the disclosure of which is incorporated herein by reference.

BACKGROUND

1. Field

Apparatuses consistent with exemplary embodiments relate to a display apparatus, and more particularly, to a display apparatus capable of enhancing cooling efficiency.

2. Description of the Related Art

In general, a display apparatus is an apparatus, such as a TV or a monitor, capable of displaying images.

The display apparatus may be classified into several categories according to different display mechanisms. For example, a display apparatus could be liquid crystal display (LCD) or a plasma display panel (PDP), which are largely used.

An LCD is provided with a liquid crystal display panel, which is not capable of self-radiating lights, and thus includes a backlight assembly to generate light for the LCD panel.

The backlight assembly includes a light source to generate light, optical members to enhance efficiency of the light, and a bottom chassis to accommodate the light source and the optical members.

Meanwhile, the high-temperature heat generated from the light source may increase the internal temperature of the backlight assembly, and an acceleration of heating may occur due to the increased internal heat.

SUMMARY

Therefore, aspects of the exemplary embodiments provide a display apparatus including a cooling path provided to enhance cooling efficiency.

Additional aspect of the exemplary embodiments provide a display apparatus provided to be isolated from outside environment while having a sealed cooling structure configured not to inlet outside air.

Additional aspects of the exemplary embodiments provide a display apparatus capable of enhancing durability through diffusing heat and reducing temperature of an internal of a backlight unit Additional aspects of the exemplary embodiments will be set forth in part in the description which follows and, in part, will be obvious from the description, or may be learned by practice of the disclosure.

In accordance with one aspect of the exemplary embodiments, this is provided a display apparatus including a display panel configured to display images; a light source configured to emit light to the display panel; a bottom chassis disposed in rear of the light source; a case provided in rear of the bottom chassis; a circulative cooling path configured to allow air to circulate surroundings of the bottom chassis; and a blower apparatus configured to drive the air to circulate through the circulative cooling path.

In addition, the circulative cooling path may include a first cooling path positioned in front of the bottom chassis, and a second cooling path provided between a rear surface of the bottom chassis and a front surface of the case.

In addition, the first cooling path and the second cooling path may be connected with each other.

In addition, the bottom chassis may be provided with an air flowing unit formed thereto to connect the first cooling path with the circulative cooling path.

In addition, the display apparatus may include a partition wall spaced apart toward a rear of the bottom chassis, and the second cooling path may be formed between the partition wall and the case.

In addition, a third cooling path may be formed between a rear surface of the bottom chassis and the partition wall.

In addition, the circulative cooling path may include at least one cooling path, and the blower apparatus may be disposed inside the cooling path.

In addition, the second cooling path may include a guide unit provided to guide air current.

In addition, the guide unit may include a first guide rib formed with a first angle.

In addition, the first angle may be about 90°.

In addition, the guide unit may include a second guide formed with a second angle.

In addition, the second angle may be an obtuse angle, and the second guide unit comprises a plurality of second guides connected with each other The blower apparatus may include a blower fan, and a fan motor to drive the blower fan.

In accordance with an aspect of the exemplary embodiments, this is provided a display apparatus including a case; a display panel installed inside the case; a light source provided as to radiate light to the display panel; a bottom chassis configured to support the light source; and a circulative cooling path to cool the display panel and the light source inside the case, and the circulative cooling path may include a first cooling path provided at a front of the bottom chassis, and a second cooling path provided in between a rear surface of the bottom chassis and a front surface of the case, and the first cooling path and the second cooling path may be connected with each other.

In addition, the display apparatus may further include a blower apparatus having a blower fan to circulate air through the circulative cooling path, and a fan motor provided to drive the blower fan.

In addition, the bottom chassis may be provided with an air flowing unit formed thereto to connect the first cooling path with the circulative cooling path.

In addition, the air flowing unit may be formed on at least one side of the bottom chassis is open.

In addition, the bottom chassis may include a partition wall provided while being spaced apart toward a rear thereof, and the second cooling path may be formed between the partition wall and the case.

In addition, a third cooling path may be formed between a rear surface of the bottom chassis and the partition wall.

In addition, the circulative cooling path may include at least one cooling duct, and the blower apparatus may be disposed inside the cooling duct.

In addition, the second cooling path may include a guide unit provided as to guide an air current.

In addition, the guide unit may include a first guide formed t with a first angle with respect to the partition wall.

In addition, the first angle is about 90°.

In addition, the guide unit may include a second guide formed with a second angle with respect to the partition wall.

In addition, the second angle may be an obtuse angle, and a plurality of the second guide may be provided by connecting with each other.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EXEMPLARY EMBODIMENTS

Figure 1:
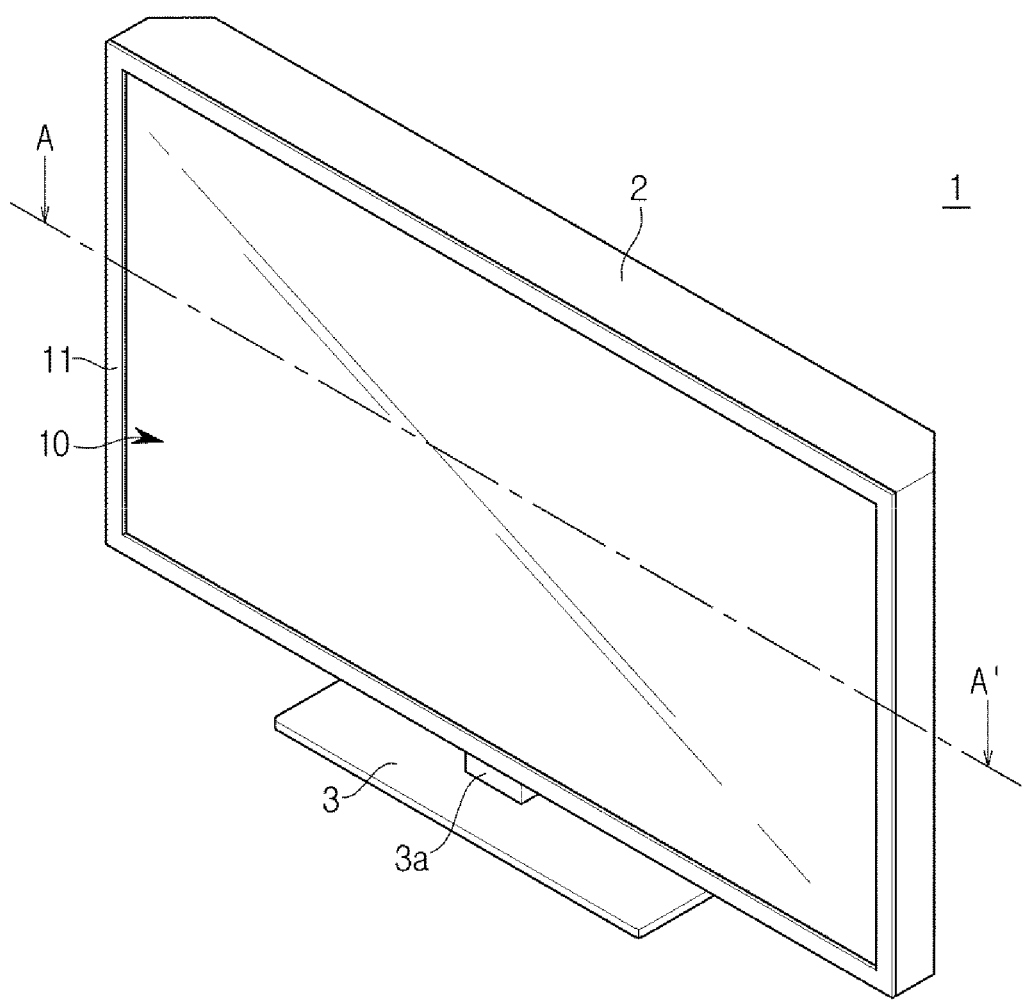
FIG. 1 illustrates a perspective view showing a display apparatus according to an exemplary embodiment.

Reference will now be made in detail to the embodiments of the present disclosure, examples of which are illustrated in the accompanying drawings, wherein like reference numerals refer to like elements throughout. Meanwhile, terminologies such as "a front end," "a rear end," "an upper portion," "a lower portion," "an upper end," and "a lower end" used in descriptions below are defined while having the drawings as references, and the shapes and positions of each component of the present disclosure are not limited to the terminologies as such.

Figure 2:
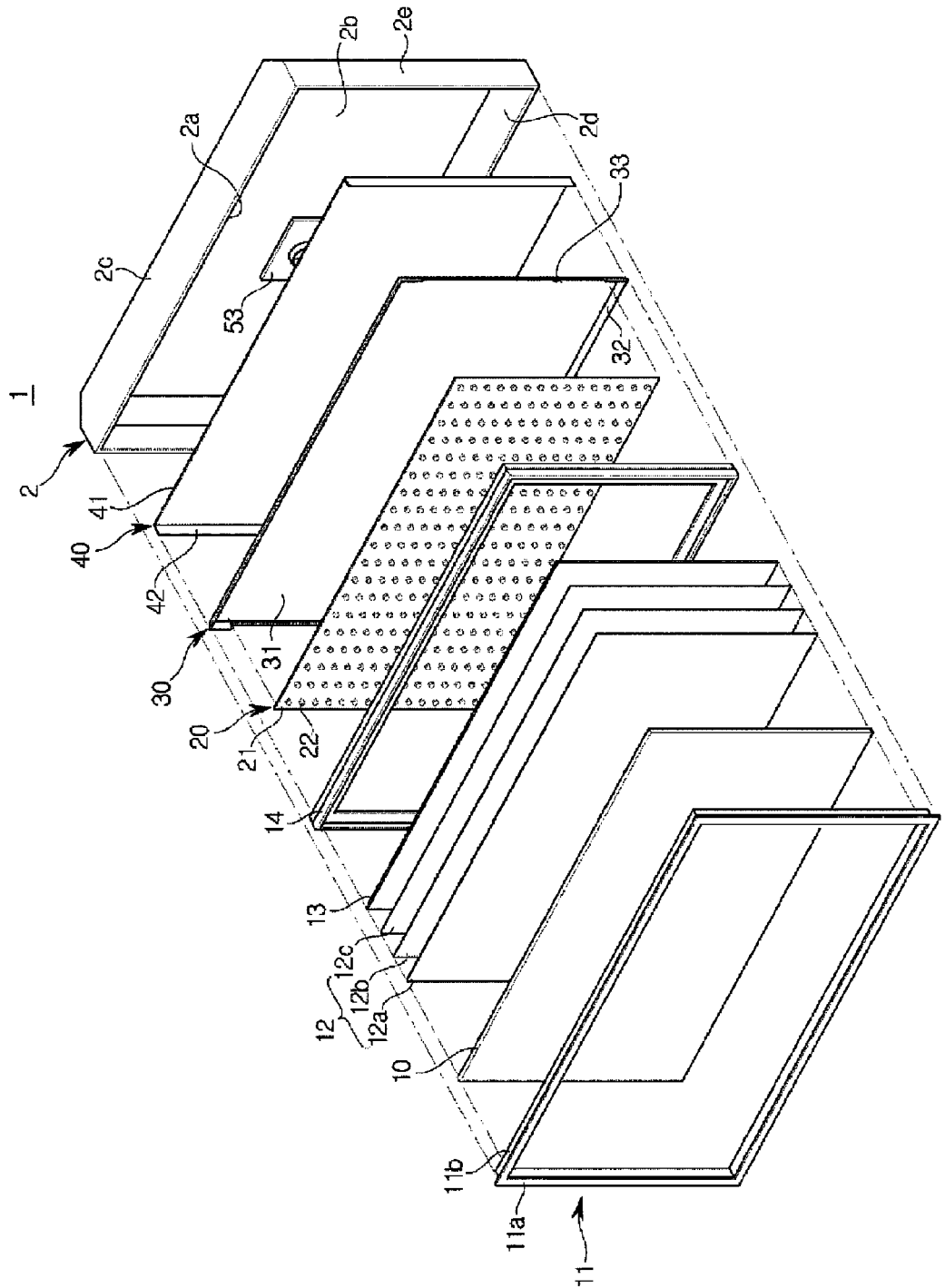
FIG. 2 illustrates an exploded perspective view showing the display apparatus according to an exemplary embodiment.

FIG. 1 is a perspective view showing a display apparatus according to an exemplary embodiment. FIG. 2 is an exploded perspective view showing the display apparatus according to an exemplary embodiment. As illustrated on FIG. 1 and FIG. 2, a display apparatus 1 includes a display panel 10 to display image information, and a case 2 to protect the display panel 10 and interior electronic components of the display panel 10 while disposed at an to form the exterior of the display panel 10.

The display panel 10 may be implemented with a liquid crystal display panel. Generally, the liquid crystal display panel may include two sheets of glass with a liquid layer injected between a TFT board and a color board, and may also include a driving circuit capable of driving pixels arranged in a matrix to control the light transmission rate of each of the pixels. In this way, an image could be displayed by the LCD panel.

The case 2 is formed to wrap around borders and a rear surface of the display panel 10 from a rear of the display panel 10. The case 2 is provided in the shape of a hexahedron having an open unit 2a at a front surface thereof, and includes a rear surface 2b spaced apart from an open unit 2a, an upper surface 2c connected to an upper side of the rear surface 2b, a lower surface 2d connected to a lower side of the rear surface 2b, and side surfaces 2e each connected to left and right sides of the rear surface 2b.

A lower portion of the case 2 is provided with a base 3 supported by an installation surface configured to install a bottom of the display apparatus 1. The case 2 and the base 3 may be connected to a stand 3a vertically provided at the base 3.

The display apparatus 1 may be fixed at a wall through a wall-mounting bracket installed at the wall, in place of the stand 3a. In this case, the wall-mounting bracket may be detachably installed at the case 2, or may be fixed at the wall through the case 2.

A top chassis 11 is formed in the shape of a rectangular ring, and may include a bezel unit 11a supporting borders of a front surface of the display panel 10, and a top chassis side surface unit 11b installed at a middle mold 14, which is to be described later, extended toward a rear from an outer side end of the bezel unit 11a.

The middle mold 14 is provided to support the display panel 10. The middle mold 14 is provided to be supported at the top chassis side surface unit 11b of the top chassis 11.

The display panel 10 is provided with a light source 20 provided to radiate light to the display panel 10, a diffusion panel 13 to diffuse the radiated light, and a plurality of optical sheets 12 to improve optical characteristics of the light passed through the diffusion panel 13.

The optical sheets 12 includes a diffusion sheet 12c to diffuse the light passed through the diffusion panel 13, a prism sheet 12b having a pattern formed by one or more prisms such that the light diffused by the diffusion sheet 12 may be collected in a vertical direction with respect to the display panel 10 positioned in front of the diffusion sheet 12, and a protective sheet 12a provided as to protect the prism sheet 12b sensitive to scratches while disposed at a front of the prism sheet 12b.

The light source 20 may include a printed circuit board 21 formed in the shape of a plane panel, and a plurality of light-emitting diodes 22 embedded on the printed circuit board 21.

Meanwhile, in an exemplary embodiment, an example in which the plurality of light-emitting diodes 22 is provided to directly radiate light to the display panel 10 while installed behind the display panel 10 is illustrated, but the aspect of the present disclosure is not limited hereto. For example, a light guiding panel may be disposed at a rear side of the display panel and the light-emitting diodes may be disposed at a side of the light guiding panel so that light may be radiated into a side end of the light guiding panel.

A rear of the display panel 10 is provided with a bottom chassis 30 provided as to accommodate the light source 20.

The bottom chassis 30 includes a supporting unit 31 formed in the shape of a plane panel such that the light source 20 is accommodated, and an installation unit 32 formed to be installed at the middle mold 14 while forming the four borders of the supporting unit 31.

The supporting unit 31 of the bottom chassis 30 is provided such that the printed circuit board 21 of the light source 20 may be accommodated thereto. Therefore, the printed circuit board 21 may be formed to correspond to or smaller than the supporting unit 31 of the bottom chassis 30.

The installation unit 32 of the bottom chassis 30 is provided with an air flowing unit 33 formed thereto as to form a circulative cooling path 100, which is to be described later. The air flowing unit 33 may be formed as portions of the both sides of the bottom chassis 30.

The air flowing unit 33 may be formed as end units of the both left and right sides of the bottom chassis 30, and the air flowing unit 33 formed at the each of the left and right sides may be formed in the corresponding size and shape with respect to each other. The air inside the display apparatus 1 may be provided to easily move toward a front and a rear of the bottom chassis 30 through the air flowing units 33.

The air flowing unit 33 of an exemplary embodiment is illustrated to be formed at each of the both sides of the bottom chassis 30 as an example, but the aspect of the present disclosure is not limited hereto. For example, the air flowing unit 33 may be formed at a portion of a bottom chassis supporting unit 31. In this case, the air flowing unit 33 may be formed lengthways in vertical direction at a predetermined position at each of the left and right sides of the supporting unit.

Meanwhile, a rear of the bottom chassis 30 may be provided with a partition wall 40 disposed while spaced apart by a predetermined distance. The partition wall 40 includes a first partition wall 41 corresponding to the supporting unit 31 of the bottom chassis 30, and a second partition wall 42 formed at each of the both sides of the first partition wall 41.

The second partition wall 42 is provided to be connected to the bottom chassis 30. The second partition wall 42 may be connected to the installation unit 32 of the bottom chassis 30.

Meanwhile, the light source 20 installed at the bottom chassis 30 may generate high-temperature heat following radiation. The internal of the display apparatus 1 may be cooled due to the heat generated at the light source 20.

The circulative cooling path 100 is formed between the bottom chassis 30 and the case 2 to have air circulated at the surroundings of the bottom chassis 30 to cool down the display apparatus 1.

Figure 3:
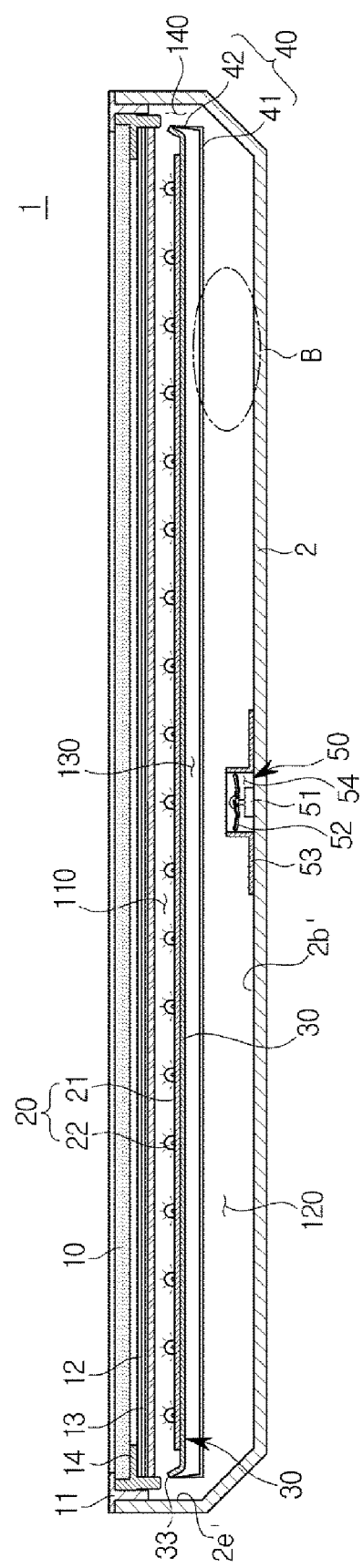
FIG. 3 illustrates a cross-sectional view of a display apparatus along a line A-A' of FIG. 1.
Figure 4:
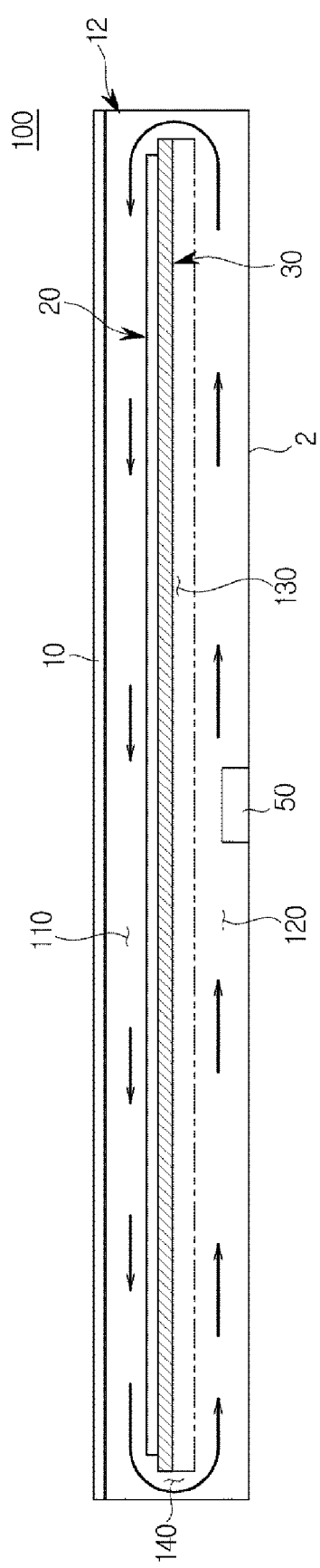
FIG. 4 illustrates a drawing schematically showing a circulative cooling path of a display apparatus according to an exemplary embodiment.

FIG. 3 is a cross-sectional view of a display apparatus along a line A-A' of FIG. 1. FIG. 4 is a drawing schematically showing a circulative cooling path of a display apparatus according to an exemplary embodiment. As illustrated on FIG. 3 and FIG. 4, the circulative cooling path 100 may include a first cooling path 110 provided at a front of the bottom chassis 30, a second cooling path 120 provided at a rear of the bottom chassis 30, and a connecting path 140 connecting the first cooling path 110 and the second cooling path 120.

The first cooling path 110 is provided at the front of the bottom chassis 30, and is provided to alleviate the heat generated from the printed circuit board 21 and the plurality of light-emitting diodes 22 of the light source 20.

The first cooling path 110 may be formed between a front surface of the bottom chassis 30 and a rear surface of the display panel 10. In this case, the rear surface of the display panel 10 may be provided with the plurality of optical sheets 12 and the diffusion panel 13.

Therefore, the heat generated from the printed circuit board 21 and the plurality of light-emitting diodes 22 installed on the bottom chassis 30 may be alleviated.

The second cooling path 120 may be formed in between the partition wall 40 and the case 2 provided in rear of the bottom chassis 30. The second cooling path 120 is formed between a rear surface of a first partition wall 41 and an inner side surface 2b' of a rear surface of the case 2.

In this case, the first cooling path 110 and the second cooling path 120 may be connected to each other. For example, the first cooling path 110 and the second cooling path 120 may be connected to each other by the connecting path 140. The connecting path 140 may be included at the second cooling path 120 and may be formed between a second partition wall 42 and a side surface 2e' of an inner side of the case 2.

The connecting path 140 provided to connect the first cooling path 110 and the second cooling path 120 may be formed by the air flowing unit 33 of the bottom chassis 30. In an exemplary embodiment, the connecting path 140 is formed between the second partition wall 42 and the inner side surface 2e' of the case 2, but the aspect of the present disclosure is not limited hereto. For example, the connecting path may be included in the second cooling path.

In addition, the partition wall 40 installed at the bottom chassis 30 may form a third cooling path 130 between the partition wall 40 and a rear surface of the bottom chassis 30. The third cooling path 130 may be formed by a gap distance I between the bottom chassis 30 and the partition wall 40. The third cooling path 130 may be formed between a rear surface of the bottom chassis 30 and a front surface of the first partition wall 41. The third cooling path 130 is provided with an upper end and a lower end thereof open, and is provided to connect with the first cooling path 110 and the second cooling path 120, respectively.

Meanwhile, in an exemplary embodiment, the bottom chassis 30 is provided with a separate partition wall 40 at a rear thereof, and the second cooling path 120 of the circulative cooling path 100 is formed between the partition wall 40 and the case 2, and the aspect of the present disclosure is not limited hereto. For example, the second cooling path 120 may be formed between the rear surface of the bottom chassis 30 and the inner surface 2b' of the case 2.

By use of the structure, the air circulating the surroundings of the bottom chassis 30 inside the display apparatus 1 forms a single closed loop. That is, the air may cool down the display apparatus while moving and circulating through the first cooling path 110 formed in front of the bottom chassis 30, the connecting path 140 formed at the side of the bottom chassis 30, the second cooling path 120 formed at the rear of the bottom chassis 30, the connecting path 140 at the other side of the bottom chassis 30, and again the first cooling path 110.

In addition, the optical area may be expanded by use of the circulative cooling path 110. For example, the heat conductive and heat radiant areas disposed inside the display apparatus 1 may be accordingly expanded to dissipate the heat. For example, the air is circulated through the circulative cooling path 100 and the heat is carried by the air due to a convective effect and then dissipated through the areas to reduce the temperature.

In this case, a blower apparatus 50 may be installed at the inner surface 2b' of the rear surface of the case 2. The blower apparatus 50 may include a blower fan 52, and a fan motor 51 provided to drive the blower fan 52.

The case 2 may be provided with an installation bracket 53 for the blower apparatus 50 to be installed. The installation bracket 53 may be installed at a center of the inner surface 2b' of the rear surface of the case 2. The installation bracket 53 may be provided with a blower fan accommodation unit 54 formed thereto such that the fan motor 51 and the blower fan 52 may be accommodated.

Meanwhile, the air sealed and circulated inside the display apparatus 1 by use of the circulative cooling path 100 may be provided with enhanced moving speed by use of the blower fan 52, and the temperature reduction may be accelerated.

At this time, the blower fan 52 and the fan motor 51 configured to drive the blower fan 52 may be formed in a plurality of units.

Figure 5:
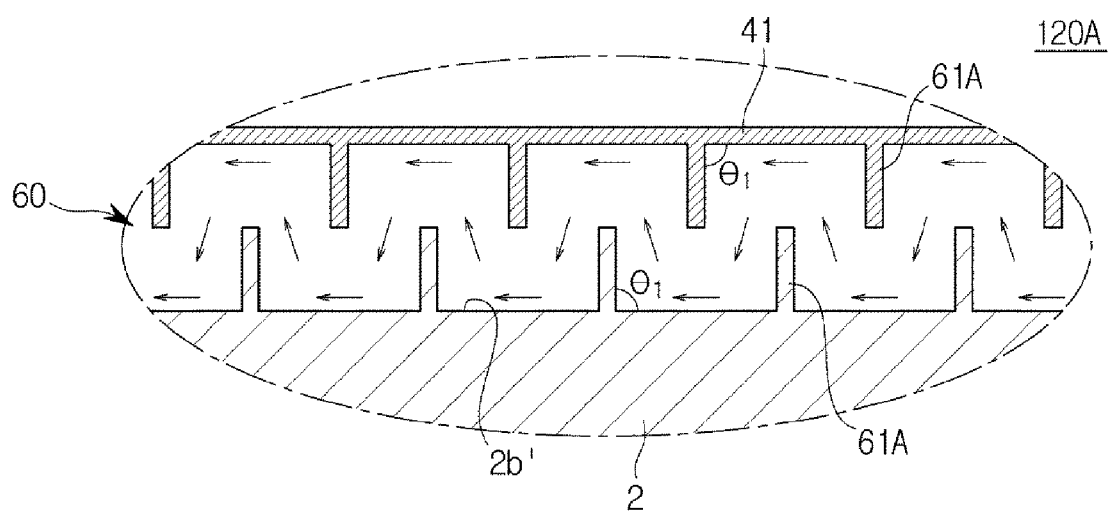
FIG. 5 illustrates an enlarged view of a B portion of FIG. 3 schematically illustrating an internal structure of the circulative cooling path according to an exemplary embodiment.

FIG. 5 is an enlarged view of a B portion of FIG. 3 schematically illustrating an internal structure of the circulative cooling path according to an exemplary embodiment.

As illustrated on FIG. 5, a second cooling path 120A of the circulative cooling path 100 is provided between the first partition wall 41 and the inner surface 2b' of the rear surface of the case 2.

At this time, a guide unit 60 may be provided at the first partition wall 41 and the inner surface 2b' of the rear surface of the case 2 as to guide air current.

The guide unit 60 may be provided to change the direction of the air being inlet to the second cooling path 120. The guide unit 60 includes a first guide 61A formed with a first angle θ1 with respect to the first partition wall 41 and the inner surface 2b' of the rear surface of the case 2.

A plurality of the first guide 61A are formed on each of the first partition wall 41 and the inner surface 2b' of the rear surface of the case 2.

The first guide 61A formed at the first partition wall 41 extends toward a center of the second cooling path 120 with the first angle θ1. The first guide 61A formed at the inner side surface 2e of the rear of the case 2 protrudes and extends toward the center of the second cooling path 120 with the first angle θ1. The plurality of the first guide 61A may be disposed to be spaced apart with respect to each other by a predetermined distance.

In this case, the first angle θ1 may be provided with an approximate degree at 90°.

The first guide 61A formed at the first partition wall 41 and the first guide 61A formed at the inner side surface 2e of the rear of the case 2 may be alternatively disposed with respect to each other.

Meanwhile, the air being inlet to the second cooling path 120A of the circulative cooling path 100 contacts the first guide 61A inside the second cooling path 120A, and then the moving direction (the arrow shown in FIG. 5) of the air is directed by the first guide 61A, and thus cooling effect may be obtained.

The first guide 61A formed inside the second cooling path 120A may enhance the cooling effect of air by maximizing the contact surface and flow effect of the air.

Figure 6:
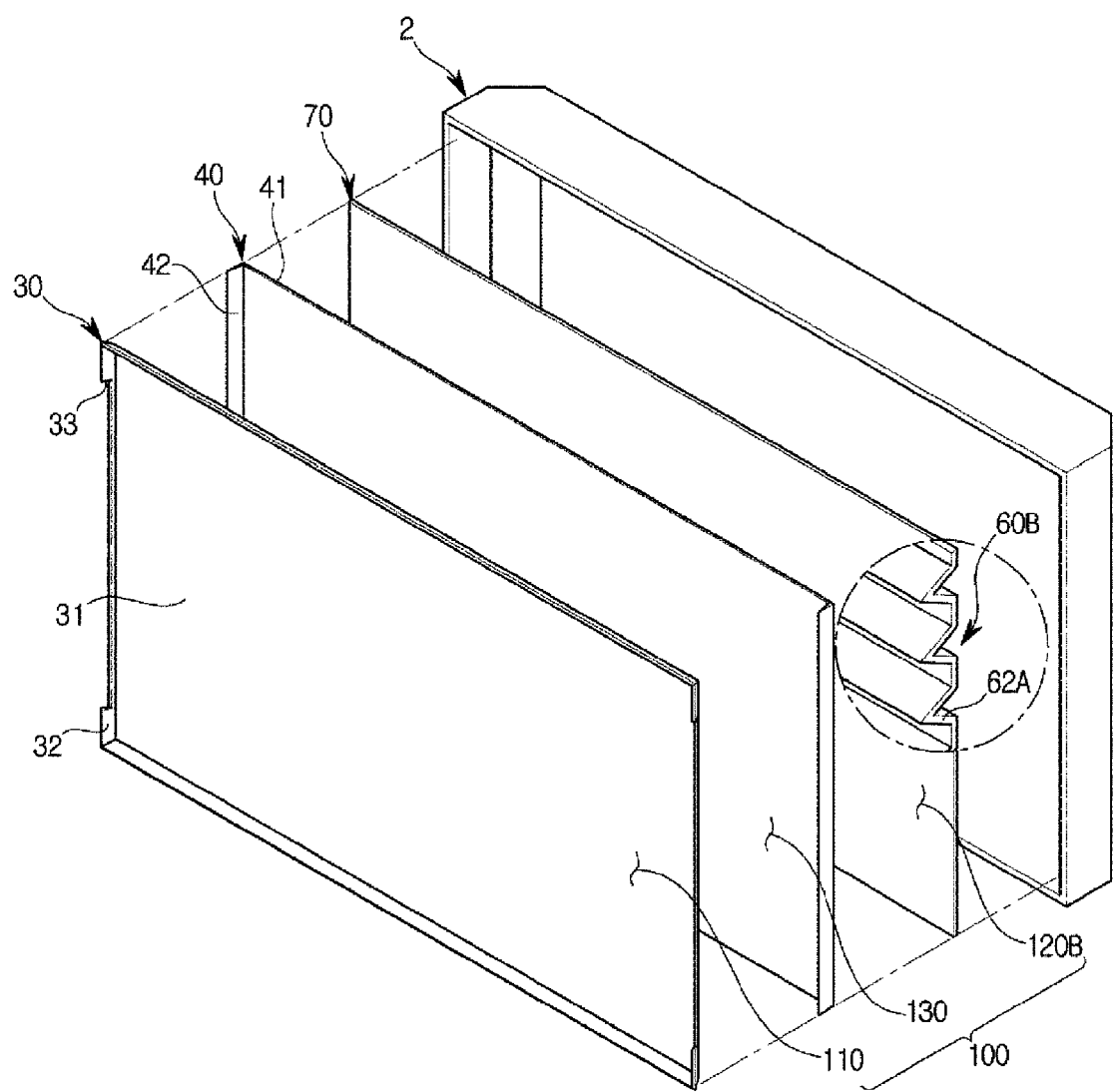
FIG. 6 illustrates an exploded perspective view schematically showing a display apparatus forming a circulative cooling path according to an exemplary embodiment.
Figure 7:
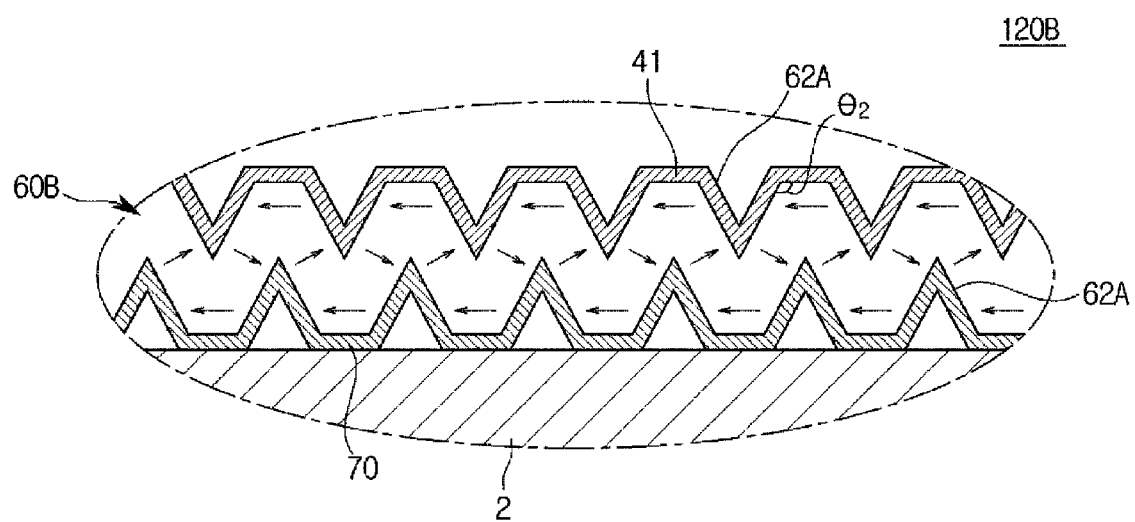
FIG. 7 illustrates a drawing showing a cooling path of a circulative cooling path according to an exemplary embodiment.

FIG. 6 is an exploded perspective view schematically showing a display apparatus forming a circulative cooling path according to an exemplary embodiment, and FIG. 7 is a drawing showing a cooling path of a circulative cooling path according to an exemplary embodiment.

As illustrated on FIG. 6 and FIG. 7, a circulative cooling path 120B of a display apparatus according to an exemplary embodiment includes the first cooling path 110 and a second cooling path 120B connected with the first cooling path 110.

The first cooling path 110 is provided in front of the bottom chassis 30, and the second cooling path 120B is provided in rear of the bottom chassis 30.

The second cooling path 120B may be formed between the partition wall 40 provided in rear of the bottom chassis 30 and a plate 70 provided in front of the case 2. The second cooling path 120 may be formed between a rear surface of the first partition wall 41 and a front surface of the plate 70.

The plate 70 may have a size corresponding to the rear surface 2b of the case 2 and may be formed in the shape of a panel.

In this case, a guide unit 60B may be provided at the first partition wall 41 and the plate 70 to guide air current. The guide unit 60B may be provided to change the direction of the air being inlet to the second cooling path 120B. The guide unit 60B includes a second guide 62A formed to be provided with a second angle 82 with respect to the first partition wall 41 and a surface of the plate 70.

A plurality of the second guides 62A are formed on each of the first partition wall 41 and the plate 70.

The second guide 62A formed on the first partition wall 41 protrudes and extends toward a center of the second cooling path 120B with the second angle 82. The second guide 62A formed on the plate 70 protrudes and extends toward the center of the second cooling path 120B with the second angle 82. The plurality of the second guide 62A may be disposed to be spaced apart with respect to each other by a predetermined distance.

In this case, the second angle 82 is an obtuse angle between the plate 70/first partition wall 41 and the second guide 62A. From FIG. 7, it is shown that two adjacent second guides 62A may be connected to form a shape of a triangle toward the center of the second cooling path 120B.

Therefore, the air being inlet to the second cooling path 120B of the circulative cooling path 100 i contacts the second guide 62A inside the second cooling path 120B, and then the flowing direction of the air is directed by the second guide 62A, and thus cooling effect may be obtained.

The second guide 62A formed inside the second cooling path 120B may enhance the cooling effect of air by maximizing the contact surface and flow effect of the air.

Meanwhile, the first cooling path 110 and the second cooling path 120B may be connected with each other by use of the connecting path 140. The structure of the first cooling path 110 and the connecting path 140 is identical to the above, and redundant descriptions will be omitted.

FIG. 8 to FIG. 12 illustrate drawings showing a plurality of cooling paths according to an exemplary embodiment.

Figure 8:
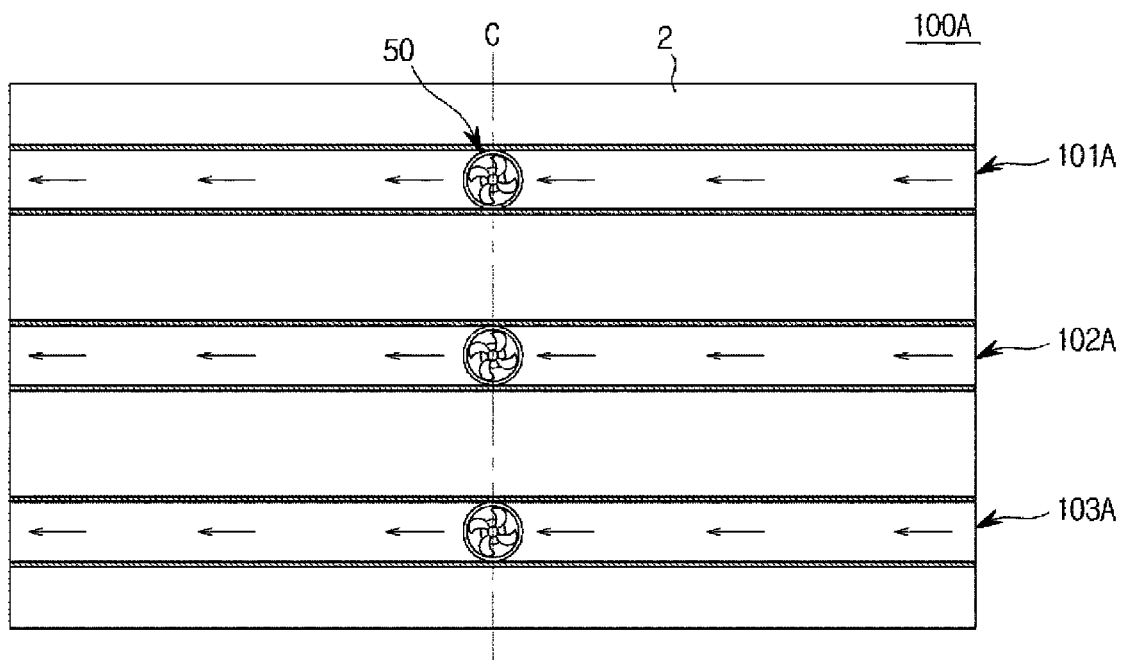
FIGS. 8 to 12 illustrate drawings showing a plurality of cooling paths according to an exemplary embodiment.
Figure 9:
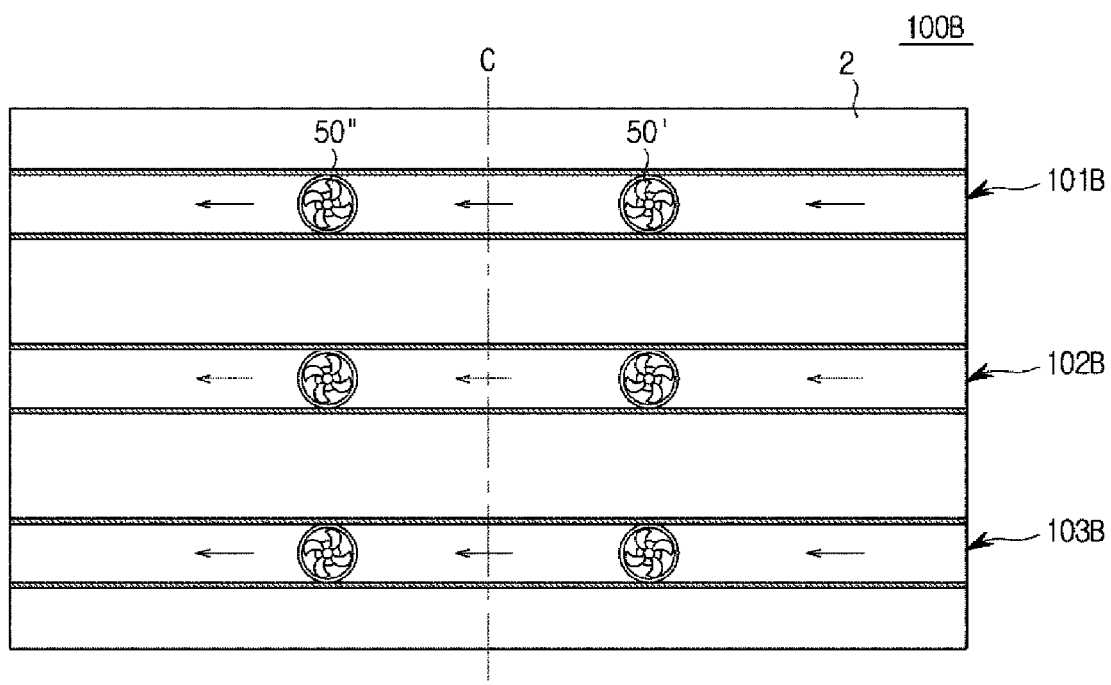

As illustrated on FIG. 8 and FIG. 9, the circulative cooling path 100A may include a plurality of cooling ducts 101A, 102A, and 103A.

The plurality of cooling ducts 101A, 102A, and 103A may be provided to form a sealed circulative path while connected with the first cooling path 110 in front of the bottom chassis 30.

The plurality of cooling ducts 101A, 102A, and 103A may be provided on the inner surface 2b' of the rear surface 2b of the case 2.

The plurality of cooling ducts 101A, 102A, and 103A may include a first cooling duct 101A formed at an upper side of the case 2, a second cooling duct 102A formed at a center of the case 2, and a third cooling duct 103A formed at a lower side of the case 2.

The first cooling duct 101A, the second cooling duct 102A, and the third cooling duct 103A are parallelly arranged in a horizontal direction of the case 2. The blower apparatus 50E is installed inside each of the plurality of cooling ducts 101A, 102A, and 103A. The blower apparatus 50 may be disposed at a center of each of the plurality of cooling ducts 101A, 102A, and 103A.

Therefore, the air inside each of the plurality of cooling ducts 101A, 102A, and 103A may move due to the blower apparatus 50.

In addition, the circulative cooling path 100B includes a plurality of cooling ducts 101B, 102B, and 103B. A plurality of blower apparatuses 50' and 50" may be installed inside each of a plurality of cooling ducts 101B, 102B, and 103B.

The blower apparatuses 50' and 50" may be installed on an inner side of each of the first cooling duct 101B, the second cooling duct 102B, and the third cooling duct 103B. A first blower apparatus 50' and a second blower apparatus 50" may be disposed with a distance from a center C of each of the cooling ducts 101B, 102B, and 103B.

Figure 10:
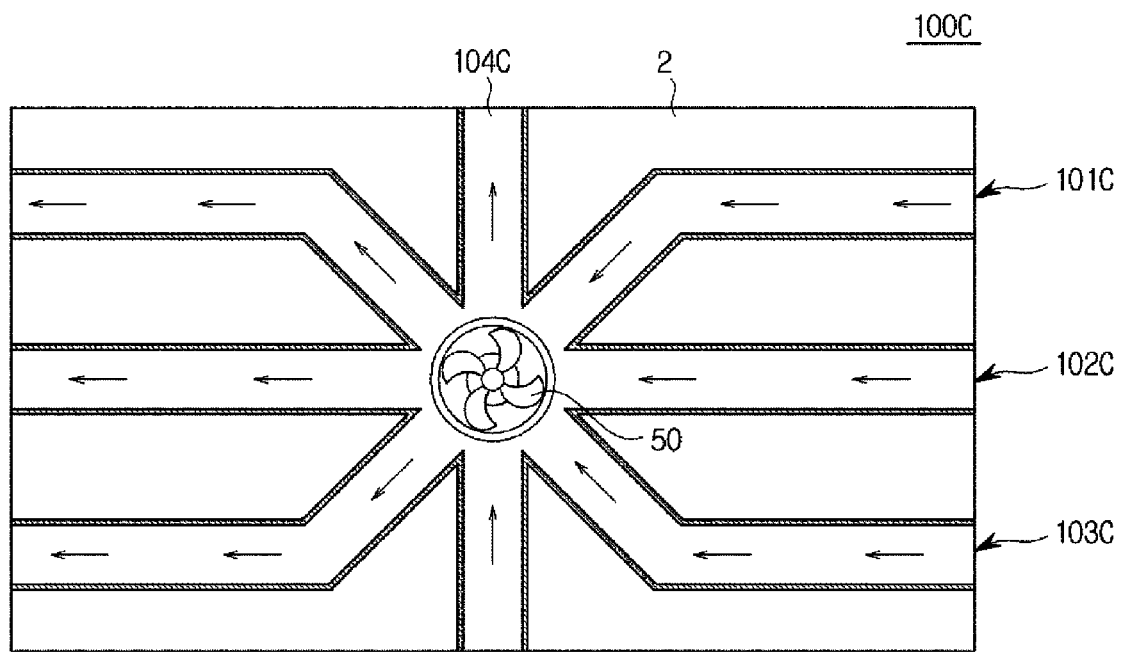

As illustrated on FIG. 10, the circulative cooling path 100C includes a plurality of cooling ducts 101C, 102C, 103C, and 104C, which includes a first cooling duct 101C, a second cooling duct 102C, a third cooling duct 103C formed in a horizontal direction of the case 2, and also includes a fourth cooling duct 104C formed in a vertical direction of the case 2.

The first cooling duct 101C is formed to be inclined in a lower direction from an upper portion of one side of the case 2 to a lower portion of the other side of the case 2, the second cooling duct 102C is formed in a horizontal direction from a center of one side of the case 2 to a center of the other side of the case 2, and the third cooling duct 103C is formed to be inclined in an upper direction from a lower portion of one side of the case 2 to an upper portion of the other side of the case 2.

The fourth cooling duct 104C is disposed at the center C of the case 2, and is formed while vertically extended from a lower end to an upper end.

At this time, the first cooling duct 101C, the second cooling duct 102C, the third cooling duct 103C, and the fourth cooling duct 104C may be connected with each other at the center C of the case 2.

The blower apparatus 50 may be installed at the center C of the case 2, which is also the center of each of the first cooling duct 101C, the second cooling duct 102C, the third cooling duct 103C, and the fourth cooling duct 104C.

Therefore, the air inside each of the first cooling duct 101C, the second cooling duct 102C, the third cooling duct 103C, and the fourth cooling duct 104C may be circulated and moved through the first cooling path 110 by use of the blower apparatus 50.

Figure 11:
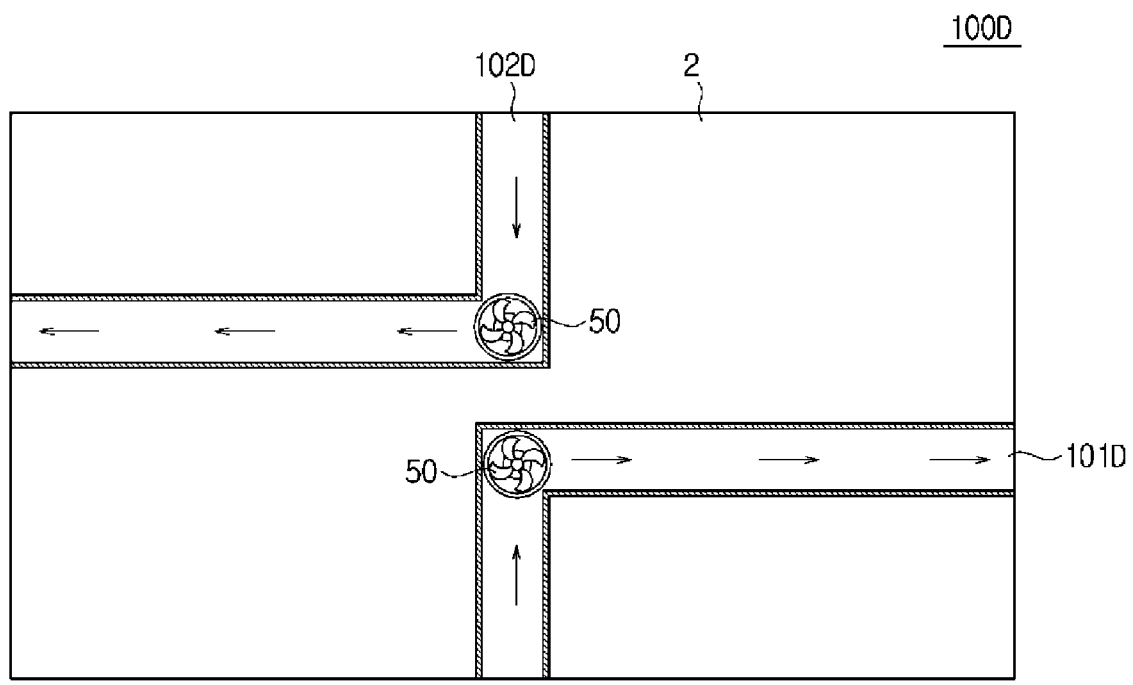

As illustrated on FIG. 11, the circulative cooling path 100D includes a first cooling duct 101D and a second cooling duct 102D.

The first cooling duct 101D and the second cooling duct 102D may be provided with the approximate shape of '⌐' or '⌐', and may be formed in the vertically bent shapes. The first cooling duct 101D extends in a horizontal direction from an end portion of one side of the case 2 to the center C, and is formed in the bent shape from the center toward a lower side.

Therefore, the air being inlet through the first cooling path 110 to the first cooling duct 101D may be moved toward a lower side after being inlet through a side direction of the case 2 along the first cooling duct 101D. In this case, the blower apparatus 50 may be disposed at the bent portion of the first cooling duct 101D.

In addition, the second cooling duct 102D extends in a horizontal direction from an end portion of the other side of the case 2 to the center C, and is formed in the bent shape from the center toward an upper side.

Therefore, the air being inlet through the first cooling path 110 to the second cooling duct 102D may be moved toward an upper side after being inlet through a side direction of the case 2 along the second cooling duct 102D. In this case, the blower apparatus 50 may be disposed at the bent portion of the second cooling duct 102D.

Figure 12:
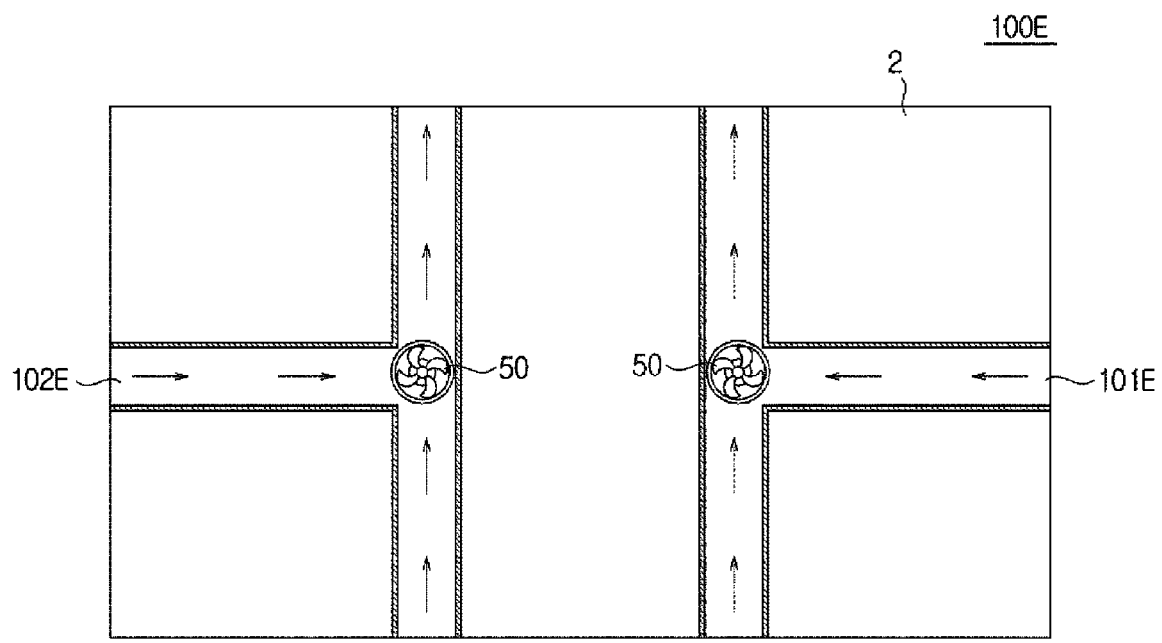

As illustrated on FIG. 12, the circulative cooling path 100E includes a first cooling duct 101E and a second cooling duct 102E.

The first cooling duct 101E and the second cooling duct 102E may be provided with the approximate shape of '⊢' or '⊣'.

The first cooling duct 101E extends in a horizontal direction from an end portion of one side of the case 2 to the center C, and is formed in the vertically extended shape toward an upper side and a lower side from the center.

Therefore, the air being inlet through the first cooling path 110 to the first cooling duct 101E may be moved toward an upper side or a lower side after being inlet through a side direction of the case 2 along the first cooling duct 101E, or the air being inlet through a lower side may be moved toward an upper side or a side direction.

In this case, the blower apparatus 50 is disposed at a center of the first cooling duct 101E.

In addition, the second cooling duct 102E extends in a horizontal direction from an end portion of the other side of the case 2 to the center C, and is formed in the vertically extended shape toward an upper side and a lower side from the center.

Therefore, the air being inlet through the first cooling path 110 to the second cooling duct 102E may be moved toward an upper side or a lower side after being inlet through a side direction of the case 2 along the second cooling duct 102E.

Or, the air being inlet into the second cooling duct 102E may be moved toward an upper side or a side direction.

Similarly, the blower apparatus 50 is disposed at a center of the first cooling duct 102E.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus, comprising:
a display panel configured to display images;
a light source configured to emit light to the display panel;
a bottom chassis disposed at a rear of the light source;
a partition wall spaced apart toward a rear of the bottom chassis;
a case provided at a rear of the partition wall;
a circulative cooling path configured to circulate air to surroundings of the bottom chassis, the circulative cooling path comprising a first cooling path provided in front of the bottom chassis, and a second cooling path provided between a rear surface of the bottom chassis and a front surface of the case; and
a blower apparatus configured to drive the air through the circulative cooling path,
wherein the second cooling path comprises a guide unit configured to guide air current, the guide unit comprising a plurality of first guides extending from the rear surface of the partition wall toward a center of the second cooling path with a first angle.

2. The display apparatus of claim 1, wherein the first cooling path and the second cooling path are connected with each other.

3. The display apparatus of claim 1, further comprising:
an air flowing unit, formed on at least one side of the bottom chassis, the air flowing unit configured to connect the first cooling path with the second cooling path.

4. The display apparatus of claim 1,
wherein the second cooling path is formed between the partition wall and the case.

5. The display apparatus of claim 4, wherein the circulative cooling path further comprises a third cooling path formed between a rear surface of the bottom chassis and the partition wall.

6. The display apparatus of claim 1, wherein the circulative cooling path comprises at least one cooling path, and the blower apparatus is disposed inside the circulative cooling path.

7. The display apparatus of claim 1, wherein the guide unit further comprises the plurality of first guides extending from the case toward the center of the second cooling path with the first angle.

8. The display apparatus of claim 7, wherein the first angle is substantially equal to 90°.

9. The display apparatus of claim 1, wherein the guide unit is formed on the partition wall and a plate between the case and the partition wall, and the guide unit further comprises a plurality of second guides extending from the plate toward the center of the second cooling path with a second angle.

10. The display apparatus of claim 9, wherein the second angle is an obtuse angle, and wherein the plurality of second guides are connected with each other.

11. The display apparatus of claim 1, wherein the blower apparatus comprises:
a blower fan; and a fan motor configured to drive the blower fan.

12. A display apparatus, comprising:
a case;
a display panel installed inside the case;
a light source configured to radiate light toward the display panel;
a bottom chassis configured to support the light source; and
a circulative cooling path configured to cool the display panel and the light source,
wherein the circulative cooling path comprises a first cooling path provided in front of the bottom chassis, and a second cooling path provided between a rear surface of the bottom chassis and a front surface of the case,
wherein the first cooling path and the second cooling path are connected with each other, and
wherein the second cooling path comprises a guide unit configured to guide air current, the guide unit comprising a plurality of first guides extending from the case toward a center of the second cooling path with a first angle.

13. The display apparatus of claim 12, further comprising:
a blower apparatus comprising:
a blower fan configured to circulate air through the circulative cooling path; and
a fan motor configured to drive the blower fan.

14. The display apparatus of claim 12, further comprising:
an air flowing unit, formed on the bottom chassis, configured to connect the first cooling path with the second cooling path.

15. The display apparatus of claim 14, wherein the air flowing unit is formed on at least a portion of one side of the bottom chassis.

16. The display apparatus of claim 12, further comprising:
a partition wall spaced apart toward a rear of the bottom chassis,
wherein the second cooling path is formed between the partition wall and the case.

17. The display apparatus of claim 16, wherein the circulative cooling path further comprises a third cooling path formed between a rear surface of the bottom chassis and the partition wall.

18. The display apparatus of claim 13, wherein the circulative cooling path comprises at least one cooling duct, and the blower apparatus is disposed inside the cooling duct.

* * * * *